(No Model.)
B. T. KUHL.
STEAMER AND BAKER.
No. 538,920. Patented May 7, 1895.
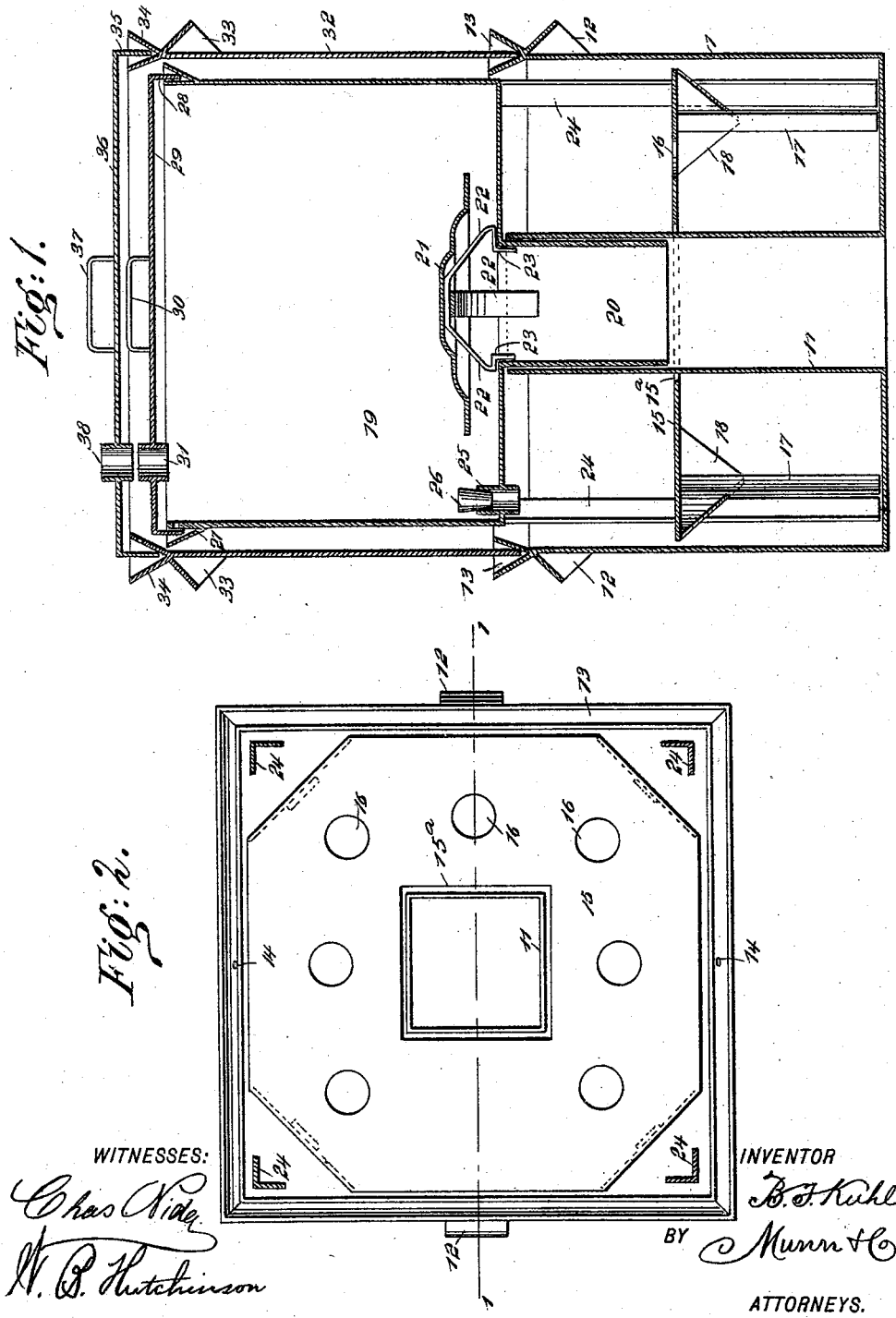
WITNESSES:
Chas Nide
W. B. Hutchinson
INVENTOR
B. T. Kuhl
BY Munn & Co
ATTORNEYS.

UNITED STATES PATENT OFFICE.

BURCHARD T. KUHL, OF ORLANDO, FLORIDA.

STEAMER AND BAKER.

SPECIFICATION forming part of Letters Patent No. 538,920, dated May 7, 1895.

Application filed October 26, 1894. Serial No. 527,014. (No model.)

*To all whom it may concern:*

Be it known that I, BURCHARD T. KUHL, of Orlando, in the county of Orange and State of Florida, have invented a new and Improved Steamer and Baker, of which the following is a full, clear, and exact description.

My invention relates to improvements in that class of devices which are used in steaming and baking various articles of food; and the object of my invention is to produce a cheap and simple apparatus of this kind, which may be used over a lamp or other simple article to generate heat, which is provided with a lower steaming compartment adapted for use either in steaming food or making jelly, preserves and analogous things, which has an upper oven adapted to bake any necessary things, which has this oven arranged so that it can be converted into a steaming chamber if desired, which has its parts arranged so as to be readily accessible, which has its joints closed by a water seal so that the flavor of the things cooked may be retained and the odor prevented from escaping into the room, and which is arranged so that articles within it may be kept hot with a very small supply of heat.

To these ends my invention consists of certain features of construction and combinations of parts, which will be hereinafter described and claimed.

Reference is to be had to the accompanying drawings, forming a part of this specification, in which similar figures of reference indicate corresponding parts in both views.

Figure 1 is a central vertical section, on the line 1 1 of Fig. 2, of my improved apparatus, showing all the parts in position for use; and Fig. 2 is a plan view of the lower receptacle of the apparatus with the oven-legs in section.

The complete apparatus and also its several compartments are of a generally rectangular shape, although it is evident that this shape may be varied and modified without affecting the principle of the invention.

The apparatus has a lower receptacle 10 which is open at the top, is provided with a central flue 11, leading from the bottom to the top, with ears or handles 12 by which it may be lifted, and with a trough 13 extending around its upper edge so as to receive the lower edge of the upper shell, which will be hereinafter described, and by filling the trough with water a perfect seal is made. The trough is provided on its inner side with perforations 14 so that the water of condensation which collects in the trough 13 may overflow into the receptacle 10.

The receptacle 10 is adapted to contain water and steam and it is provided with a stand on which articles may be held above the water, this stand comprising a flat top 15 which has a central opening $15^a$ to receive the flue 11, holes 16 for the passage of steam, and supporting legs 17 which are braced by braces 18, these being formed by doubling down the corners of the stand top.

The oven 19 is adapted to rest above the receptacle 10 and is provided with a central depending flue 20 which is adapted to enter the flue 11, as shown in Fig. 1. The oven has, in the bottom, a removable deflector plate 21 which is concave on the under side and which is held above the flue 20 by arms 22, these being bent inward so as to enter the flue 20 and having shoulders 23 to rest on the oven bottom and support the deflector plate. This arrangement causes the heat which enters through the flue to be diffused evenly through the oven, and it also prevents the steam from rushing down too rapidly through the flue when the oven is used as a steam chamber.

The oven 19 is supported on legs 24 which are secured to the corners thereof and are long enough to extend to the bottom of the receptacle 10 and hold the oven above the said receptacle, as shown in Fig. 1, these legs being preferably angular in cross section which renders them strong yet light. The oven is also provided with an inlet pipe 25 at the bottom which permits steam to enter the oven if desired, but which when the oven is used for baking is closed by a plug 26. The oven has a trough 27 around its top edge, like the trough 13 already described, and this trough receives the flange 28 of the cover 29 which has a suitable handle 30 and a vent 31. The vent may be used to give a draft to the oven.

The oven 19 is incased in a shell 32 which is large enough to afford a good steam space between it and the oven, and this shell is adapted to rest in the trough 13 of the receptacle 10. The shell 32 has suitable handles 33 and has also a top trough 34 like the troughs 13 and 27 described above, and the shell has also a cover 36, the flange 35 of which enters the trough 34, and the cover has a handle 37 and a vent pipe 38 which is placed preferably above the pipe 31 so that the surplus heat of the oven and the surplus steam in the steamer may escape through the said vent pipe and under the cover.

If the apparatus is to be used for simultaneously steaming certain articles and baking certain others, it is arranged as shown in Fig. 1, a little water being placed in the receptacle 10, the articles to be steamed being placed on the stand 15 and the articles to be baked being placed in the oven 19. The troughs 13, 27 and 34 are filled with water, thus making a perfect seal, and the heat is applied to the flue 11 and to the bottom of the receptacle 10. The water in the receptacle will thus be turned to steam, which steams the articles on the stand 15 and enveloping the oven 19 thoroughly heats it from the outside, while the rising heat in the flues 11 and 20 also enters the oven and thoroughly heats it. As the steam in the apparatus condenses, it runs into the several troughs and overflows on the inner side so as to run down into the receptacle 10 and be again converted into steam.

If the whole apparatus is to be used as a steamer, the plug 26 is pulled out the vents 31 and 38 closed and steam permitted to enter the oven 19. The apparatus may be kept hot by the application of very little heat, so that food may be preserved in a hot condition for a long time. A large steam space may be secured by removing the oven and large articles can then be conveniently cooked.

If the apparatus is to be used for cooking jellies, preserves, or for analogous purposes, everything is removed from the receptacle 10 and the article to be cooked is placed in the receptacle, and if desired the cover 36 may be applied to it.

Having thus described my invention, I claim as new and desire to secure by Letters Patent—

1. An apparatus of the kind described, comprising a lower receptacle having a vertical flue therein, an oven having a bottom flue to enter the flue of the lower receptacle, and a suitable cover, and a covered inclosing shell for the oven, adapted to rest on the top edge of the lower receptacle, substantially as described.

2. The combination, with the lower receptacle having the flue, of the oven having a bottom flue to connect with the flue of the lower receptacle, a deflector plate above the flue, a plug-controlled inlet in the oven bottom, a cover for the oven, and a shell to inclose it and rest on the lower receptacle, substantially as described.

3. A steamer and baker, comprising a closed receptacle, a stand supported in the receptacle above the bottom thereof, and an oven of less diameter than the receptacle and supported in the upper part of the receptacle, the said oven being provided in its bottom with an inlet opening adapted to be closed by a plug, substantially as described.

4. A steamer and baker, comprising a closed receptacle having a central flue, a stand supported in the receptacle, an oven of less diameter than the receptacle and provided with a depending flue fitting in the flue of the receptacle, supporting legs, and an opening in its bottom adapted to be closed by a plug, and a removable deflector in the bottom of the oven, substantially as described.

5. A steamer and baker, comprising a receptacle having a flue for the entry of hot air and having a water chamber formed in its bottom, a stand arranged in the receptacle above the water level in the water chamber, an oven having close walls provided with an opening corresponding to the mouth of the hot air flue and adapted to receive hot air therefrom, said oven being provided with means for supporting it in the receptacle out of contact with the walls thereof, and above the stand therein, whereby a steam chamber is formed in the receptacle inclosing the oven, substantially as set forth.

6. A steamer and baker, comprising a receptacle having a central flue, a stand in the receptacle, an oven of less diameter than the receptacle supported in the receptacle above the stand and having an opening in its bottom adapted to be closed by a plug, a deflector in the bottom of the oven above the flue of the receptacle, and a casing of the same diameter as the receptacle and supported upon the same and surrounding the oven, substantially as herein shown and described.

BURCHARD T. KUHL.

Witnesses:
H. H. DICKSON,
B. H. KUHL.